US012600809B2

(12) United States Patent
Dou et al.

(10) Patent No.: US 12,600,809 B2
(45) Date of Patent: Apr. 14, 2026

(54) ETHYLENE-VINYL ALCOHOL COPOLYMER COMPOSITION, AND PREPARATION METHOD THEREFOR

(71) Applicants: CHINA PETROLEUM & CHEMICAL CORPORATION, Beijing (CN); SINOPEC CHONGQING SVW CHEMICAL CO., LTD., Chongqing (CN)

(72) Inventors: Yuqin Dou, Chongqing (CN); Qingquan Wang, Chongqing (CN); Lamei Hu, Chongqing (CN); Lingzhi He, Chongqing (CN); Yingbin Huang, Chongqing (CN); Wen Wang, Chongqing (CN); Siquan Wan, Chongqing (CN)

(73) Assignees: CHINA PETROLEUM & CHEMICAL CORPORATION, Beijing (CN); SINOPEC CHONGQING SVW CHEMICAL CO., LTD., Chongqing (CN)

( * ) Notice: Subject to any disclaimer, the term of this patent is extended or adjusted under 35 U.S.C. 154(b) by 478 days.

(21) Appl. No.: 18/248,704

(22) PCT Filed: Oct. 14, 2021

(86) PCT No.: PCT/CN2021/123860
§ 371 (c)(1),
(2) Date: Apr. 12, 2023

(87) PCT Pub. No.: WO2022/078457
PCT Pub. Date: Apr. 21, 2022

(65) Prior Publication Data
US 2023/0416425 A1     Dec. 28, 2023

(30) Foreign Application Priority Data

Oct. 15, 2020   (CN) .......................... 202011103182.7
Oct. 15, 2020   (CN) .......................... 202011104215.X

(51) Int. Cl.
| | |
|---|---|
| *C08F 210/02* | (2006.01) |
| *C08F 216/06* | (2006.01) |
| *C08K 3/26* | (2006.01) |
| *C08K 3/32* | (2006.01) |
| *C08K 3/38* | (2006.01) |

(52) U.S. Cl.
CPC .......... *C08F 210/02* (2013.01); *C08F 216/06* (2013.01); *C08K 3/26* (2013.01); *C08K 3/32* (2013.01); *C08K 3/38* (2013.01); *C08F 2810/50* (2013.01); *C08K 2003/262* (2013.01); *C08K 2003/324* (2013.01); *C08K 2201/014* (2013.01)

(58) Field of Classification Search
CPC ........ C08F 210/02; C08F 216/02; C08K 3/26; C08K 3/32; C08K 3/38
See application file for complete search history.

(56) References Cited

U.S. PATENT DOCUMENTS

| | | | |
|---|---|---|---|
| 5,118,743 A | | 6/1992 | Yonezu et al. |
| 5,342,662 A | * | 8/1994 | Aoyama ................. B32B 27/08 |
| | | | 428/476.3 |
| 2002/0100997 A1 | | 8/2002 | Kawahara et al. |
| 2005/0027053 A1 | | 2/2005 | Kawamura et al. |
| 2010/0289172 A1 | | 11/2010 | Fujimura et al. |

FOREIGN PATENT DOCUMENTS

| | | |
|---|---|---|
| CN | 1290209 A | 4/2001 |
| CN | 1597758 A | 3/2005 |
| CN | 1616536 A | 5/2005 |
| (Continued) | | |

OTHER PUBLICATIONS

International Search Report (PCT/ISA/210) with an English translation, and Written Opinion (PCT/ISA/237) mailed on Nov. 24, 2021, by the China National Intellectual Property Administration as the International Searching Authority for International Application No. PCT/CN2021/123860. (8 pages).

(Continued)

*Primary Examiner* — John E Uselding

(74) *Attorney, Agent, or Firm* — Panitch Schwarze Belisario & Nadel LLP

(57) ABSTRACT

Described are an ethylene-vinyl alcohol (EVOH) copolymer composition, and a preparation method therefor. The composition contains an EVOH copolymer, element potassium, and element sodium, wherein the mass ratio of element sodium to element potassium is 0.1:1 to 1:1. By controlling the contents of element sodium and element potassium in an EVOH resin composition to fall within a specific proportion range, the heat resistance of the resulting EVOH resin composition is greatly improved, the initial decomposition temperature can be increased to 370-400° C., the maximum decomposition temperature can be increased to 400-440° C., and thus EVOH resin can adapt to the process requirement for a higher processing temperature. Moreover, further adding acyl-containing carboxylic acid and a phosphorus-containing compound/boron-containing compound can improve the thermal yellowing resistance of the EVOH resin composition, where the value of the yellowing index (YI) after 5-hour thermal treatment at 150° C., is increased by 15 or less.

17 Claims, No Drawings

(56)     References Cited

FOREIGN PATENT DOCUMENTS

| | | | |
|---|---|---|---|
| CN | 1271095 | C | 8/2006 |
| CN | 101910294 | A | 12/2010 |
| CN | 104220518 | A | 12/2014 |
| CN | 105593290 | A | 5/2016 |
| CN | 105623163 | A | 6/2016 |
| CN | 106146718 | A | 11/2016 |
| EP | 0 386 720 | B1 | 9/1990 |
| EP | 2 196 312 | B1 | 6/2010 |
| EP | 2 832 787 | B1 | 2/2015 |
| JP | S6469652 | A | 3/1989 |
| JP | 2005054013 | A | 3/2005 |
| WO | 0020211 | A1 | 4/2000 |

OTHER PUBLICATIONS

Li et al., "Ethylene vinyl alcohol copolymer (EVOH) properties and development status", An Hui Chemical Industry, Feb. 2019, vol. 45, No. 1, pp. 14-16, with an English translation.
Wang, "Ethylene-vinyl alcohol copolymer (EVOH)", Jilin Petrochemical, No. 1, Dec. 31, 1994, pp. 45-47, with partial English translation.

* cited by examiner

ETHYLENE-VINYL ALCOHOL COPOLYMER COMPOSITION, AND PREPARATION METHOD THEREFOR

CROSS REFERENCE TO RELATED APPLICATIONS

The application claims benefit of the Chinese patent application No. "202011103182.7", filed on Oct. 15, 2020, and the Chinese patent application No. "202011104215.X", filed on Oct. 15, 2020, the contents of which are entirely incorporated herein by reference.

TECHNICAL FIELD

The present invention involves with an ethylene-vinyl alcohol copolymer composition and a preparation method therefor.

BACKGROUND ART

EVOH resins have excellent odor barrier properties, transparency and glossiness, and are resistant to grease, chemicals, ultraviolet light and other radiation rays, and exhibit desirable mechanical properties, strength and tensile modulus, thus can be used as composite packaging films, foaming processes, hollow containers and barrier layers for meat, grease, industrial solvents, pesticides and the like. In addition, the EVOH resins may be compounded with other materials to form the fire-resistant, antibacterial and anti-oxidant materials.

However, EVOH resins have poor heat resistance, and are prone to cause yellowing of the product at high temperatures and generation of the thermal decomposition products during the fabrication process (which is typically melt processing), thereby affecting the product quality.

Currently, the problem is mainly solved by adding additives, for example, CN105623163A improves thermal stability of a copolymer composition containing an ethylene and vinyl alcohol structure unit by adding 0.1-4.0% by mass of component B (an acid selected from one of inorganic acids or organic carboxylic acids or a mixture thereof, the organic carboxylic acid is selected from polycarboxylic acid having 2-20 carbon atoms), 0.01-1.8% of component C (an organic phenol or amine compound) and 0.1-4.0% of component D (an alkali metal or an alkaline earth metal salt) relative to the mass of copolymer composition. It is alleged in the invention that the prepared composition has the initial decomposition Temperature (T0) of 264° C. and 236° C. and the decomposition temperature (Td) of 326° C. and 311° C. under nitrogen gas and air atmosphere, respectively. However, the solution has limited improvement in regard to the thermal stability, and cannot meet the application requirement of higher processing temperature.

WO0020211A1 increases the stability of EVOH resin composition by adding the boron compounds such as boric acid, borate ester and borate, which can raise the initial decomposition temperature by 40-50° C. However, the EVOH composition obtained with the method has a problem of an increased melt viscosity during the melt processing, thereby leading to the inconvenience of processing.

SUMMARY OF THE INVENTION

The invention aims to overcome the defect in the prior art that the EVOH resin composition suffer from poor thermal stability, thereby providing an EVOH resin composition having higher thermal stability and a preparation method therefor.

A first aspect of the invention provides an ethylene-vinyl alcohol copolymer composition, the composition contains an ethylene-vinyl alcohol copolymer, element potassium and element sodium, characterized in that the mass ratio of element sodium to element potassium is 0.1:1 to 1:1, preferably 0.2:1 to 0.8:1, more preferably 0.3:1 to 0.5:1.

A second aspect of the invention provides a preparation method of ethylene-vinyl alcohol copolymer composition, characterized in that the method comprises subjecting the ethylene-vinyl acetate copolymer obtained from the polymerization reaction to an alcoholysis and molding granulation, then washing to remove most of element sodium, subsequently adding a potassium source in an amount such that the mass ratio of element sodium to element potassium is 0.1:1 to 1:1, preferably 0.2:1 to 0.8:1, more preferably 0.3:1 to 0.5:1.

In the present invention, by controlling the contents of element sodium and element potassium in an EVOH resin composition to fall within a specific proportion range, the heat resistance of the resulting EVOH resin composition is greatly improved, the initial decomposition temperature can be increased to 370-400° C., the maximum decomposition temperature can be increased to 400-440° C., and thus EVOH resin can adapt to the process requirement for a higher processing temperature. Moreover, further adding acyl-containing carboxylic acid and a phosphorus-containing compound/boron-containing compound can improve the thermal yellowing resistance of the EVOH resin composition, where the value of the yellowing index (YI) after 5-hour thermal treatment at 150° C., is increased by 15 or less.

The preparation method of EVOH resin composition provided by the invention is simple and easy to operate, and can facilitate the industrial production.

DESCRIPTION OF THE PREFERRED EMBODIMENT

The ethylene-vinyl alcohol copolymer composition, comprising ethylene-vinyl alcohol copolymer as the main ingredient, is obtained by alcoholysis after copolymerization of the ethylene-vinyl acetate; wherein the element sodium is brought from a byproduct produced during alcoholysis of ethylene-vinyl acetate copolymer, the content of element sodium is usually reduced by the subsequent process of water scrubbing and acid pickling. It is generally considered that the content of element sodium shall be controlled within a low range as far as possible, in order to obtain the ethylene-vinyl alcohol copolymer composition with desirable performance.

The inventors of the present invention have surprisingly discovered that the heat resistance of the produced EVOH resin composition can be substantially improved by adding element potassium after the alcoholysis and washing process, and controlling the mass ratio of element sodium to element potassium within a specific range of 0.1:1 to 1:1, preferably 0.2:1 to 0.8:1, more preferably 0.3:1 to 0.5:1.

The better effects can be obtained by controlling the content of element sodium within a certain range. The total amount of element potassium and element sodium is preferably 100-3,000 ppm, more preferably 200-2,000 ppm, further preferably 500-1,000 ppm, relative to the mass of ethylene-vinyl alcohol copolymer.

Preferably, the element potassium is present in an ionic form, more preferably in a form of potassium salt, and further preferably the potassium salt is potassium carbonate and/or potassium bicarbonate. Potassium carbonate and potassium bicarbonate can be used for producing the superior effects than the inorganic potassium salts (e.g., potassium nitrate, potassium phosphate, potassium dihydrogen phosphate, dipotassium phosphate, potassium sulfate, potassium chloride) and the organic potassium salts (e.g., potassium acetate, potassium formate).

In order to prevent the EVOH resin composition from coloring during the melt molding process, according to a preferred embodiment of the present invention, the EVOH resin composition further comprises a monocarboxylic acid, which may be various carboxylic acid capable of achieving the above-described effects containing one COOH and not containing acyl, the monocarboxylic acid is preferably represented by the structural formula $R_1COOH$, wherein $R_1$ is an alkyl group containing 1-8, more preferably 1-5 carbon atoms, such as methyl, ethyl, propyl, isopropyl, butyl, isobutyl, tert-butyl; the monocarboxylic acid is further preferably one or more selected from the group consisting of formic acid, acetic acid, propionic acid and butyric acid.

Preferably, the monocarboxylic acid is contained in an amount of 100-3,000 ppm, more preferably 150-2,000 ppm, further preferably 300-1,000 ppm, relative to the mass of ethylene-vinyl alcohol copolymer.

The inventors of the present invention have surprisingly found that the thermal yellowing resistance of the EVOH resin composition can be further improved by arranging that the EVOH resin composition containing a certain amount of acyl-containing carboxylic acid. Therefore, it is preferable that the composition further comprises an acyl-containing carboxylic acid. Preferably, the acyl-containing carboxylic acid is contained in an amount of 50-1,000 ppm, more preferably 100-500 ppm, further preferably 200-350 ppm, relative to the mass of ethylene-vinyl alcohol copolymer.

When the composition of the present invention comprises both a monocarboxylic acid and an acyl-containing carboxylic acid, the acyl-containing carboxylic acid is preferably contained in an amount of 50-1,000 ppm, more preferably 100-500 ppm; the monocarboxylic acid is contained in an amount of 100-3,000 ppm, preferably 150-2,000 ppm, more preferably 200-1,500 ppm, relative to the mass of ethylene-vinyl alcohol copolymer.

The acyl-containing carboxylic acid may be various substances containing both acyl —C(═O)— and carboxyl —COOH in molecules, the number of acyl and carboxyl may be one or more, and one or more carbon atoms may be disposed between the acyl and carboxyl, and the acyl is preferably acetyl $CH_3$—C(═O)—. The acyl-containing carboxylic acid may contain one or more aromatic rings. The acyl-containing carboxylic acid may contain 3-10 carbon atoms. Preferably, the acyl-containing carboxylic acid is one or more selected from the group consisting of acetoacetic acid, levulinic acid, acetobutyric acid, acetylsalicylic acid, acetylsuccinic acid and acetylbenzoic acid.

It is preferable in the present invention that the acyl-containing carboxylic acid is represented by the structural formula $R_2COR_3COOH$, wherein $R_2$ is a C1-5 alkyl group, such as methyl, ethyl, propyl, isopropyl, butyl, isobutyl, tert-butyl, and further preferably methyl; that is, the alkyl-containing carboxylic acid is an acetyl-containing carboxylic acid, $R_3$ is a straight or branched chain alkylidene group having 1-5 carbon atoms, such as methylene, ethylidene and propylidene, and further preferably, $R_3$ and $R_1$ have the same number of carbon atoms. The present inventors have discovered that by arranging the alkyl-containing carboxylic acid such that $R_3$ and $R_1$ have the same number of carbon atoms, both the heat-resistant stability and thermal yellowing resistance of the produced EVOH composition are greatly improved.

The composition of the present invention may further comprise element boron and/or element phosphorus. The content of element boron calculated in terms of boric acid $H_3BO_3$ is 50-1,000 ppm, preferably 50-500 ppm, and the content of element phosphorus calculated in terms of $H_3PO_4$ is 50-1,000 ppm, preferably 100-500 ppm, relative to the mass of the ethylene-vinyl alcohol copolymer. Element boron may be present in the form of various boron-containing compounds, which may be boric acid, borate ester or borate salt. The phosphorus-containing compound may be phosphoric acid and phosphate salt, the phosphate salt is not particularly limited herein, it is preferably an alkali metal salt of phosphoric acid. Specifically, the phosphate salt may be one or more selected from the group consisting of potassium phosphate, sodium phosphate, ammonium phosphate, diammonium phosphate, ammonium dihydrogen phosphate, dipotassium phosphate, disodium phosphate, potassium dihydrogen phosphate, sodium dihydrogen phosphate. It should be noted that when the phosphorus compound is various potassium salt of phosphoric acid, the amount of potassium thereof is included in the content of element potassium in the composition.

In the present invention, the contents of element potassium and element sodium are measured using the Inductively Coupled Plasma Atomic Emission Spectrometry (ICP-0ES). The contents of the monocarboxylic acid, the acyl-containing carboxylic acid and the phosphorus compound are measured with the ion chromatography. The contents of the boron compound are determined by atomic emission spectroscopy after ashing the sample.

In the present invention, the ethylene-vinyl acetate copolymer may be EVOH copolymer obtained by various specifications and processes, and preferably, the ethylene-vinyl acetate copolymer has a melt index (190° C., 2160 g) of 0.5-10 g/10 min.

According to a preferred embodiment of the invention, the EVOH resin composition contains ethylene-vinyl alcohol copolymer, acetic acid, potassium salts and sodium salts; the acetic acid is contained in an amount of 100-3,000 ppm, relative to the mass of ethylene-vinyl alcohol copolymer; the potassium salts and sodium salts are used in an amount such that the total amount of sodium ions contained in sodium salts and potassium ions contained in potassium salts is 100-3,000 ppm, relative to the mass of ethylene-vinyl alcohol copolymer, and the mass ratio of sodium ions contained in sodium salts and potassium ions contained in potassium salts is 0.1:1 to 1:1.

The ethylene-vinyl acetate copolymer can be prepared with the conventional method in the prior art, for example, it may be prepared through the polymerization reaction; the solvent used in the polymerization reaction is an alcohol solvent, and the initiator used in the polymerization reaction is preferably an azo type initiator or a peroxide type initiator.

A second aspect of the invention provides a preparation method of ethylene-vinyl alcohol copolymer composition, characterized in that the method comprises subjecting the ethylene-vinyl acetate copolymer obtained from the polymerization reaction to an alcoholysis and molding granulation, then washing to remove most of element sodium, subsequently adding a potassium source in an amount such that the mass ratio of element sodium to element potassium is 0.1:1 to 1:1, preferably 0.2:1 to 0.8:1, more preferably 0.3:1 to 0.5:1.

Preferably, the potassium source is a potassium salt, and further preferably, the potassium salt is potassium carbonate and/or potassium bicarbonate.

Preferably, said washing process reduces the content of element sodium to 50-2,000 ppm, the potassium salt is further added to control the total amount of sodium ions and potassium ions contained in the potassium salts within the desired range.

The washing generally includes water scrubbing and acid pickling.

In the present invention, the acid pickling is preferably carried out using a monocarboxylic acid and an acyl-containing carboxylic acid.

Preferably, the mass ratio of the monocarboxylic acid and the ethylene-vinyl alcohol copolymer may be 0.0001:1 to 0.1:1, preferably 0.001:1 to 0.05:1, more preferably 0.015:1 to 0.05:1.

Further preferably, the mass ratio of the acyl-containing carboxylic acid to the monocarboxylic acid is 0.1:1 to 1:1, preferably 0.2:1 to 0.8:1, more preferably 0.2:1 to 0.5:1.

The types of monocarboxylic acid and acyl-containing carboxylic acid are as described above.

It is further preferred that the method further comprises adding a phosphorus-containing compound and/or a boron-containing compound into the ethylene-vinyl acetate copolymer obtained after the acid pickling process.

Preferably, the phosphorus-containing compound is added in an amount of 0.0002-0.001 parts by weight, relative to 1 part by weight of the ethylene-vinyl acetate copolymer.

Preferably, the boron-containing compound is added in an amount of 0.0001-0.001 parts by weight, relative to 1 part by weight of the ethylene-vinyl acetate copolymer.

The boron-containing compound and the phosphorus-containing compound may be added during the process of adding the potassium salt; the potassium salt, the boron-containing compound, and the phosphorus-containing compound may be added individually.

The manner of adding the potassium salt, the boron-containing compound, and the phosphorus-containing compound is not particularly limited herein, it is preferable that the compounds are dissolved with water, the solution is then added into the ethylene-vinyl alcohol copolymer and mixed uniformly. The concentration of said solution is not particularly limited herein, it may be various concentrations as long as the potassium salt, the boron-containing compound and the phosphorus-containing compound can be loaded onto the ethylene-vinyl alcohol copolymer. Since the ethylene-vinyl alcohol copolymer has a certain pore structure, the potassium salt, the boron-containing compound and the phosphorus-containing compound can be loaded onto the ethylene-vinyl alcohol copolymer by using a saturated impregnation method, the solvent is then removed by drying, such that the ethylene-vinyl alcohol copolymer composition is prepared.

Various methods known in the prior art may be used for preparing the ethylene-vinyl acetate copolymer through the polymerization reaction, the methods may be solution polymerization method, emulsion polymerization method or suspension polymerization method, the solution polymerization method is preferred. Preferably, the solvent used in the polymerization reaction is an alcohol solvent. The alcohol solvent may be an alcohol containing 1-4 carbon atoms, such as methanol, ethanol, propanol, ethylene glycol, n-butanol, t-butanol, or a mixed solvent of the two alcohols, or the alcohol comprising said alcohol as the main ingredient and further comprising small amount of other ingredients.

The initiator used in the polymerization reaction may be an azo type initiator or a peroxide type initiator.

Further, the azo type initiator includes an oil-soluble initiator, such as azobisisobutyronitrile, azobisisovaleronitrile, 1-((cyano-1-methylethyl)azo)formamide, 1,1'-azobis (4-cyclohexane carbonitrile), dimethyl 2,2'-azobis(2-methylpropionate).

Further, the peroxide type initiator includes an organic peroxide (e.g., benzoyl peroxide, tert-butyl benzoyl peroxide ester, methyl ethyl ketone peroxide, diisobutyryl peroxide, tert-amyl peroxydecanoate, bis (4-tert-butylcyclohexyl) peroxydicarbonate, tert-amyl peroxypivalate, tert-butyl peroxyacetate, dibutyl peroxydicarbonate) or an inorganic peroxide (e.g., hydrogen peroxide, ammonium persulfate, potassium persulfate).

Further, the initiator comprises an organic peroxy-based initiator.

Further, the proportioning relations in parts by mass are as follows: 10-40 parts of solvent, 60-200 parts of vinyl acetate monomer, 0.01-0.3 parts of initiator, and 5-60 parts of ethylene monomer.

Further, the proportioning relations in parts by mass are as follows: 10-35 parts of the solvent, 80-150 parts of the vinyl acetate monomer, 0.03-0.2 parts of the initiator, and 20-40 parts of the ethylene monomer.

The alcoholysis and the molding granulation processes are generally known among those skilled in the art, the content will not be repeated herein.

Unless otherwise specified in the present invention, the parts are referred to as parts by mass, parts by weight.

The invention will be further described in detail below with reference to the examples. In the examples, the initial decomposition temperature and the maximum decomposition temperature were measured with the following methods: a thermogravimetric analyzer was used, the temperature was raised from room temperature to 800° C. at a temperature-rise rate of 10° C./min in a nitrogen gas atmosphere; the temperature when 5% (w) of the sample was decomposed was denoted as the initial decomposition temperature $T_0$ (° C.), and the temperature when 50% (w) of the sample was decomposed was denoted as the maximum decomposition temperature $T_1$ (° C.).

The measuring method of the Yellowness Index (YI) was as follows: 10-1.5 g of the sample was weighted, the initial yellowness index and the yellowness index (YI) after 5-hour thermal treatment at 150° C. of the sample were tested with a colorimeter. A smaller value of YI indicated a lower value of yellowness.

The contents of sodium and potassium ions were measured with the following method: an EVOH sample was crushed and passed through a 100 mesh sieve, 10 g of sample and 50 ml of ion exchange water were weighted, and subjected to stirring and reflux extraction in water bath of 95° C. for 10 hours. The extracted solution was diluted 5 times (by volume) with ion exchange water, and tested using an Inductively Coupled Plasma Atomic Emission Spectrometer (ICP-0ES).

The contents of monocarboxylic acid, phosphoric acid, and acyl-containing carboxylic acid were measured with the following methods: the EVOH sample was crushed and passed through a sieve, 10 g of sample and 50 ml of deionized water were weighted, and subjected to stirring and reflux extraction in water bath of 95° C. for 10 hours. The extracted solution was diluted 5 times (by volume) with deionized water, the testing, was performed by using an ion chromatography, wherein the chromatographic column was Metrosep A Supp/250.4 the mobile phase was a mixed solution of $Na_2CO_3$ and $NaHCO_3$, the calibration fluid was an aqueous solution of sodium acetate.

The testing method of boric acid was as follows: 100 g of sample was weighted, it was ashed in a muffle furnace, then the ash was dissolved in 200 ml of aqueous nitric acid solution with a concentration of 0.01 equivalent, the content of element boron was analyzed by using an atomic absorption spectrum, the content was converted into the weight of boric acid, in order to obtain the content of said boron compound.

Example 1

A. polymerization: 25 parts of methanol, 190 parts of vinyl acetate, 0.05 parts of tert-amyl peroxyneodecanoate were added into a polymerization kettle provided with a stirrer. The ethylene was introduced to maintain the pressure in the polymerization kettle at 3.7 MPa, the polymerization reaction was performed at a temperature of 60° C. for 5 h, an ethylene-vinyl acetate copolymer solution was obtained. The ethylene and vinyl acetate monomers were removed by reducing the pressure and distillation to obtain an ethylene-vinyl acetate copolymer solution.

B. alcoholysis: the ethylene-vinyl acetate copolymer solution obtained in step A was adjusted to have a mass fraction of 40%, a sodium hydroxide-methanol solution (sodium hydroxide was used as a solute) with a concentration of 40 g/L was then added and subjected to alcoholysis, the sodium hydroxide-methanol solution is used in an amount such that a molar ratio of sodium hydroxide in the sodium hydroxide-methanol solution to vinyl acetate groups contained in the ethylene-vinyl acetate copolymer was 0.05:1, the reaction was performed for 4 hours till the completion of alcoholysis.

C. granulation: after the ethylene vinyl acetate copolymer was subjected to alcoholysis, the obtained ethylene vinyl alcohol copolymer solution passed through an extrusion device with a perforated plate and was extruded into an aqueous solution with a temperature of 5° C., the copolymer was precipitated and formed a strip shape, which was subsequently cut into granules in a conventional cutting pattern.

D. water scrubbing: the ethylene-vinyl alcohol copolymer granules were subsequently scrubbed in a kettle vessel provided with a stirring device by adding 5 times of water by mass, each time of water scrubbing was implemented for 2 hours, the water scrubbing was repeated for 2 times.

E. acid pickling: the ethylene-vinyl alcohol copolymer granules were washed in a kettle vessel provided with a stirring device by adding 5 times of water by mass, 0.015 parts by mass of acetic acid and 0.007 parts by mass of acetoacetic acid relative to the EVOH (1 part by mass) were added into the water scrubbing solution, in order to perform the acid pickling for 2 hours, the centrifugal dewatering was carried out after completion of the acid pickling process.

F. conditioning: the EVOH granules after centrifugal dewatering were then added with an aqueous solution comprising 0.0013 parts of potassium carbonate, 0.0001 parts of boric acid and 0.0006 parts of sodium dihydrogen phosphate relative to the EVOH 0 part by mass), mixed thoroughly and uniformly and subjected to the saturation impregnation, followed by drying treatment at 115° C. for 24 hours, the EVOH resin composition was prepared.

Example 2-Example 12

The EVOH resin composition was prepared according to the method in Example 1, except that the kinds and used amounts of monocarboxylic acid, acyl-containing carboxylic acid and potassium source in step E were as shown in Table 1, and the properties of the prepared EVOH resin composition were as shown in Table 2.

Comparative Example 1

The EVOH resin composition was prepared according to the method of Example 1, except that the kinds and used amounts of monocarboxylic acid and acyl-containing carboxylic acid in step E and the potassium source in step F were as shown in Table 1, and the properties of the prepared EVOH resin composition were as shown in Table 2.

TABLE 1

| | Monocarboxylic acid | Acyl-containing carboxylic acid | Potassium source | Boron source | Phosphorus source |
|---|---|---|---|---|---|
| Example 1 | 0.015 parts of acetic acid | 0.007 parts of acetoacetic acid | 0.0013 parts of potassium carbonate | 0.0001 parts of boric acid | 0.0006 parts of sodium dihydrogen phosphate |
| Example 2 | 0.04 parts of acetic acid | 0.008 parts of acetylsalicylic acid | 0.0012 parts of potassium bicarbonate | 0.0008 parts of metaboric acid | 0.0008 parts of phosphoric acid |
| Example 3 | 0.02 parts of propionic acid | 0.007 parts of levulinic acid | 0.0012 parts of potassium dihydrogen phosphate | 0.0002 parts of boric acid | 0.0004 parts of potassium dihydrogen phosphate |
| Example 4 | 0.02 parts of propionic acid | 0.007 parts of levulinic acid | 0.0012 parts of potassium dihydrogen phosphate | 0.0025 parts of boric acid | 0.0004 parts of potassium dihydrogen phosphate |
| Example 5 | 0.02 parts of propionic acid | 0.007 parts of levulinic acid | 0.0012 parts of potassium dihydrogen phosphate | — | 0.0004 parts of potassium dihydrogen phosphate |

TABLE 1-continued

|  | Monocarboxylic acid | Acyl-containing carboxylic acid | Potassium source | Boron source | Phosphorus source |
|---|---|---|---|---|---|
| Example 6 | 0.02 parts of propionic acid | 0.007 parts of levulinic acid | 0.0017 parts of potassium dihydrogen phosphate | 0.0002 parts of boric acid | — |
| Example 7 | 0.02 parts of acetic acid | 0.007 parts of levulinic acid | Same as Example 3 | 0.0002 parts of boric acid | 0.0004 parts of potassium dihydrogen phosphate |
| Example 8 | 0.05 parts of acetic acid | 0.03 parts of acetoacetic acid | 0.004 parts of potassium carbonate | — | — |
| Example 9 | 0.005 parts of acetic acid | 0.003 parts of acetylsalicylic acid | 0.004 parts of potassium bicarbonate | — | — |
| Example 10 | 0.015 parts of acetic acid | 0.004 parts of levulinic acid | 0.005 parts of potassium dihydrogen phosphate | — | — |
| Example 11 | 0.015 parts of acetic acid | — | 0.004 parts of potassium bicarbonate | — | — |
| Example 12 | 0.015 parts of acetic acid | — | 0.005 parts of potassium dihydrogen phosphate | — | — |
| Comparative Example 1 | 0.015 parts of acetic acid | — | — | — | — |

TABLE 2

|  | Mono-carboxylic acid, ppm | Acyl-containing carboxylic acid, ppm | Na, ppm | K, ppm | B, ppm | P, ppm | $T_0$, ° C. | $T_1$, ° C. | Yellowness Index (YI) Before the thermal treatment | Yellowness Index (YI) After the thermal treatment |
|---|---|---|---|---|---|---|---|---|---|---|
| Example 1 | 300 | 200 | 300 | 610 | 50 | 200 | 390 | 427 | 6 | 12 |
| Example 2 | 800 | 300 | 180 | 550 | 400 | 300 | 395 | 430 | 5 | 12 |
| Example 3 | 400 | 250 | 240 | 730 | 100 | 150 | 392 | 429 | 5 | 11 |
| Example 4 | 400 | 250 | 240 | 730 | 1000 | 150 | 390 | 426 | 5 | 12 |
| Example 5 | 400 | 250 | 240 | 730 | — | 150 | 337 | 409 | 8 | 17 |
| Example 6 | 400 | 250 | 240 | 730 | 100 | — | 350 | 411 | 9 | 18 |
| Example 7 | 400 | 250 | 240 | 730 | 100 | 150 | 330 | 405 | 8 | 18 |
| Example 8 | 1000 | 800 | 1000 | 1500 | — | — | 372 | 416 | 10 | 18 |
| Example 9 | 100 | 100 | 1400 | 1500 | — | — | 350 | 411 | 12 | 20 |
| Example 10 | 270 | 150 | 800 | 2000 | — | — | 385 | 423 | 9 | 17 |
| Example 11 | 270 | — | 1400 | 1500 | — | — | 361 | 413 | 10 | 19 |
| Example 12 | 250 | — | 800 | 2000 | — | — | 368 | 410 | 10 | 19 |
| Comparative Example 1 | 250 | — | 800 | — | — | — | 302 | 368 | 18 | 38 |

As can be seen from the data in Table 2 mentioned above, the method provided by the present invention can be used for preparing the EVOH resin composition having improved heat resistance and thermal yellowing resistance can be obtained using.

Furthermore, it shall be comprehended that although the description is specified according to the embodiments, it is not the case that every embodiment contains only one independent technical solution, such a narrative mode of the description is adopted for the sake of clarity. Those skilled in the art shall regard the description as a whole, the technical solutions in the embodiments can be appropriately combined, thereby forming the other embodiments which are understandable for those skilled in the art.

The invention claimed is:

1. An ethylene-vinyl alcohol copolymer composition, wherein:

the composition contains an ethylene-vinyl alcohol copolymer, element potassium and element sodium, wherein a mass ratio of the element sodium to the element potassium is 0.1:1 to 1:1, the composition further comprises a monocarboxylic acid $R_1COOH$, $R_1$ represents a C1-5 alkyl group, and the monocarboxylic acid is contained in an amount of 100-3,000 ppm, relative to a mass of the ethylene-vinyl alcohol copolymer; and the composition further comprises an acyl-containing carboxylic acid, and the acyl-containing carboxylic acid is contained in an amount of 50-1,000 ppm, relative to the mass of the ethylene-vinyl alcohol copolymer.

2. The composition of claim 1, wherein the mass ratio of element sodium to the element potassium is 0.2:1 to 0.8:1.

3. The composition of claim 1, wherein a total amount of the element potassium and the element sodium is 100-3,000 ppm, relative to a mass of the ethylene-vinyl alcohol copolymer.

4. The composition of claim 1, wherein the element potassium is present in an ionic form.

5. The composition of claim 1, wherein the acyl-containing carboxylic acid is one or more selected from the group consisting of acetoacetic acid, acetylsalicylic acid, levulinic acid, acetobutyric acid, acetylsuccinic acid and acetylbenzoic acid.

6. The composition of claim 1, wherein the acyl-containing carboxylic acid is represented by structural formula $R_2COR_3COOH$, wherein $R_2$ is a C1-5 alkyl group, $R_3$ is a C1-5 alkylidene group.

7. The composition of claim 1, wherein the composition further comprises element boron and/or element phosphorus; the content of the element boron calculated in terms of boric acid $H_3BO_3$ is 50-1,000 ppm, and the content of the element phosphorus calculated in terms of $H_3PO_4$ is 50-1,000 ppm, relative to the mass of the ethylene-vinyl alcohol copolymer.

8. A preparation method of the ethylene-vinyl alcohol copolymer composition of claim 1, wherein the method comprises: (i) subjecting an ethylene-vinyl acetate copolymer obtained from a polymerization reaction to an alcoholysis and molding granulation, (ii) washing the ethylene-vinyl acetate copolymer obtained in (i) to remove most of element sodium, (iii) subjecting the washed ethylene-vinyl acetate copolymer to acid picking with the monocarboxylic acid and the acyl-containing carboxylic acid, (iv) subsequently adding a potassium source.

9. The preparation method of claim 8, wherein the mass ratio of the element sodium to the element potassium is 0.2:1 to 0.8:1.

10. The preparation method of claim 8, wherein the potassium source is a potassium salt.

11. The preparation method of claim 8, wherein the washing is performed such that a total amount of the element potassium and the element sodium is 100-3,000 ppm, relative to a mass of the ethylene-vinyl alcohol copolymer.

12. The preparation method of claim 8, wherein the washing includes water scrubbing and acid pickling, the acid pickling is performed by using a monocarboxylic acid $R_1COOH$ and an acyl-containing carboxylic acid, wherein $R_1$ is a C1-5 alkyl group, a mass ratio of the monocarboxylic acid and the ethylene-vinyl alcohol copolymer is 0.0001:1 to 0.1:1, a mass ratio of the acyl-containing carboxylic acid and the monocarboxylic acid is 0.1:1 to 1:1.

13. The preparation method of claim 11, wherein the monocarboxylic acid is one or more selected from the group consisting of formic acid, acetic acid and propionic acid; the acyl-containing carboxylic acid is one or more selected from the group consisting of acetoacetic acid, acetylsalicylic acid, levulinic acid, acetylsuccinic acid and acetylbenzoic acid.

14. The preparation method of claim 11, wherein the acyl-containing carboxylic acid is represented by structural formula $R_2COR_3COOH$, wherein $R_2$ is a C1-5 alkyl group, $R_3$ is a C1-5 alkylidene group, and/or, $R_3$ and $R_1$ have the same number of carbon atoms.

15. The preparation method of claim 11, wherein the method further comprises adding a phosphorus-containing compound and/or a boron-containing compound into the ethylene-vinyl acetate copolymer obtained after the acid pickling process.

16. The preparation method of claim 14, wherein the phosphorus-containing compound is added in an amount of 0.0002-0.001 parts by weight, and the boron-containing compound is added in an amount of 0.0001-0.001 parts by weight, relative to 1 part by weight of the ethylene-vinyl acetate copolymer.

17. The preparation method of claim 8, wherein a solvent used in the polymerization reaction is an alcohol solvent, and an initiator used in the polymerization reaction is an azo initiator or a peroxide initiator.

* * * * *